United States Patent [19]

Hall, III

[11] Patent Number: 4,860,869

[45] Date of Patent: Aug. 29, 1989

[54] BRAKE APPLY SYSTEM WITH A DIFFERENTIAL MECHANISM

[75] Inventor: Arthur Hall, III, Indianapolis, Ind.

[73] Assignee: General Motors Corporation, Detroit, Mich.

[21] Appl. No.: 220,287

[22] Filed: Jul. 18, 1988

[51] Int. Cl.$^4$ .............................................. F16D 65/62
[52] U.S. Cl. ................................. 192/93 A; 464/160; 188/134; 74/650
[58] Field of Search ...................... 192/93 A; 188/134; 74/650, 63, 200; 464/160

[56] References Cited

U.S. PATENT DOCUMENTS

| | | | |
|---|---|---|---|
| 2,967,438 | 1/1961 | Altmann | 74/650 |
| 3,127,969 | 4/1964 | Hansen | 192/93 A |
| 3,129,797 | 4/1964 | Orcutt et al. | 192/93 A |
| 3,333,483 | 8/1967 | Maci et al. | 74/650 |
| 3,386,545 | 6/1968 | Hansen | 192/93 A |
| 4,509,388 | 4/1965 | Tsiriggakis | 74/650 |

Primary Examiner—Leslie A. Braun
Assistant Examiner—Nicholas Whitelaw
Attorney, Agent, or Firm—Donald F. Scherer

[57] ABSTRACT

A brake apply system has a rotary input member and two rotary output members which are operable to actuate individual brake mechanisms. Disposed between the input and output members is a differential mechanism which permits differential rotation of the output member so that the brake mechanisms can undergo separate movements during brake application to achieve full braking action. The differential mechanism is comprised of a pair of driven cam members which are rotatable in response to a cam driver which is driven by the input member. The cam driver is movable longitudinally while enforcing differential rotation of the driven cam members to initiate the differential action between the output members.

2 Claims, 2 Drawing Sheets

BRAKE APPLY SYSTEM WITH A DIFFERENTIAL MECHANISM

The invention herein described was made in the course of work under a contract or subcontract thereunder with the Department of the Army.

BACKGROUND OF THE INVENTION

This invention relates to brake apply systems and more particularly to brake apply systems having a single input and two output members with a differential action therebetween.

In most track laying vehicles, mechanical brake apply systems are utilized to actuate the service brakes for the vehicles. These brake systems require a torque splitting differential actuator, such that equal brake application will occur at the tracks, even though there might be unequal clearance between the brake shoe and the braking surface.

Prior art torque splitting devices have used gear differentials or ball spline mechanisms to establish the differential action between two brake output members. While these devices are capable of satisfactorily providing the differential action, they do require substantial axial space in the vehicle. These devices also require a number of components which require close tolerance machining, resulting in increased cost and complexity of assembly.

Ball spline torque splitting mechanisms, such as that shown in U.S. Pat. No. 3,333,483 issued to Maci et al. Aug. 1, 1967, require many components in the assembly. The mechanism must provide sufficient length to permit recirculation of the balls in the spline track. Also, a considerable amount of machining is required to produce the spline track, and the balls will generally be chosen to have substantially the same diametral dimension in each assembly. The dimensional requirement necessitates inspection and sorting prior to assembly, thus adding to the overall cost of the assembly.

SUMMARY OF THE INVENTION

The present invention provides a torque splitting differential brake actuator assembly in a compact axial space. The assembly can be produced with seven basic components, including a pair of driven members, a drive member and four balls which operate as cam drivers. There will, of course, be rotary shaft members connected between the driven members and the conventional brake apply members. However, these rotary shafts are required, regardless of the type of torque splitting differential used.

The balls or cam drivers are carried in openings in the drive member and are engageable with cam surfaces formed in the driven members. When the drive member is rotated, the balls are driven into engagement with the cam surfaces on the driven members, resulting in the rotation of the driven members. The driven members are connected to operate brake actuating members such as cams.

When brake is fully applied, its respective actuating member will cease movement and therefore prevent rotation of the respective driven member. If the brakes are fully applied simultaneously, the driven members will also be stopped from further rotation simultaneously. However, in most instances, one brake will generally need slightly more movement for full application.

In this event, the fully applied brake will stop its respective driven member which will in turn provide a reaction member for the system. Continued rotation of the drive member for full application of all brakes, will result in the balls moving relative to the cam surfaces and the drive member so that through a differential action, one driven member will continue to rotate until its respective brake is also fully applied.

The cam surfaces, for simplicity, can be viewed as ramps. When one drive member stops, the balls will move up the ramps on the stopped member, while moving down the ramps on the driven member that continues to rotate. This creates the differential action between the output members.

The balls will move in the openings in the drive member in a direction substantially parallel to the axis of rotation of the drive member. However, the axial distance between the driven members will not change; and the movement of the ball member is accommodated by relative angular movement of the driven members. When the brakes are released by the operator, the drive and driven members will return to their original position with the balls being substantially centered axially between the driven members.

It is therefore an object of this invention to provide an improved axially compact brake apply mechanism wherein a torque splitting differential is operable to permit relative movement between separate brake apply members during brake application.

It is another object of this invention to provide an improved brake apply mechanism for a multiple brake system having a torque splitting differential, wherein an input member is coupled to a pair of driven members through ball cam drivers on the input and cam surfaces on the output, and wherein the ball cam drivers will move axially relative to the input member and enforce relative rotation between the driven members when it is necessary to increase the torque to one member or otherwise split the torque to achieve full brake application.

These and other objects and advantages of the present invention will be more apparent from the following specification and drawings.

DESCRIPTION OF THE PREFERRED EMBODIMENT

Figure 1:
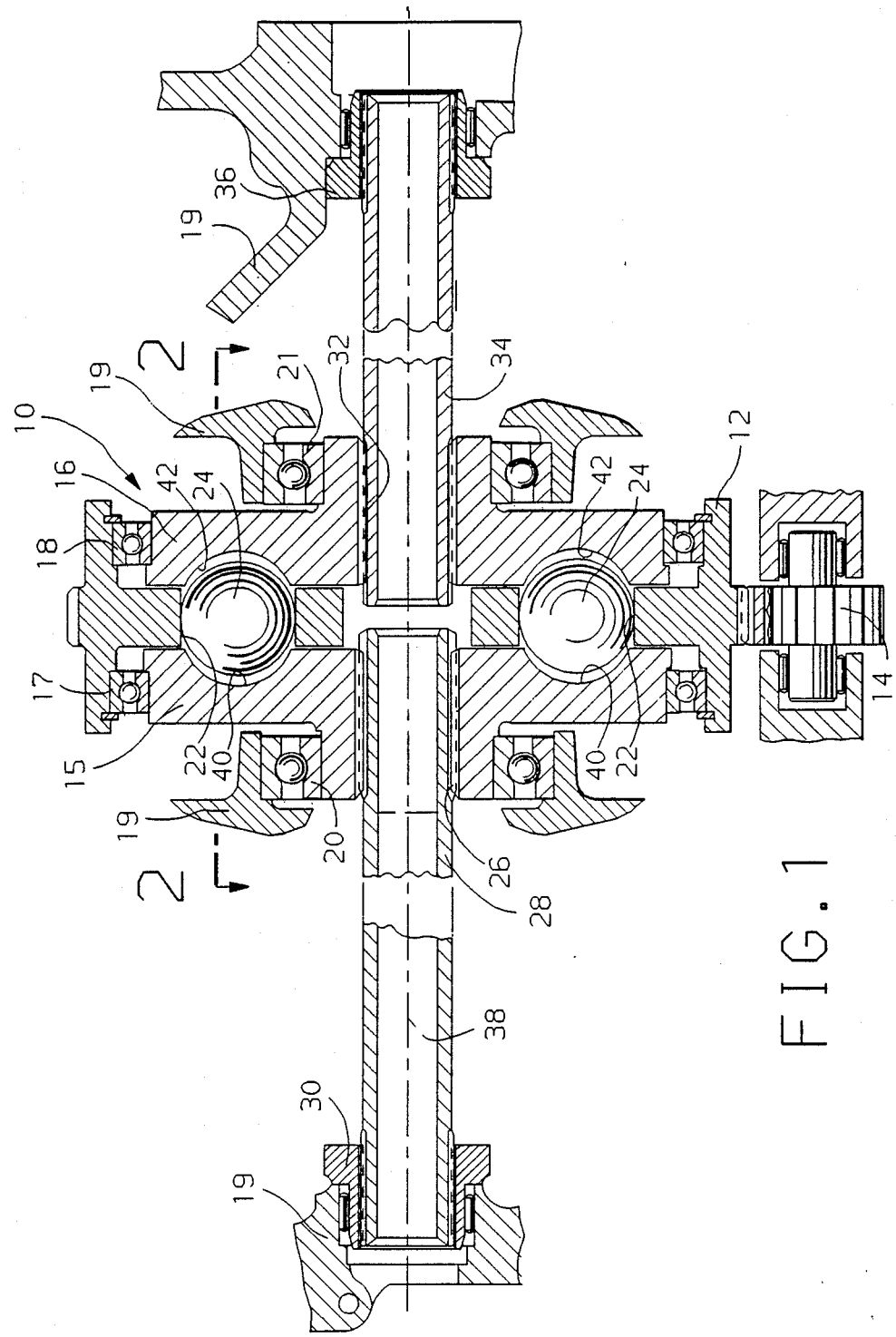
FIG. 1 is a sectional elevational view of a torque splitting differential brake apply mechanism incorporating the present invention.

Referring to the drawings, wherein like characters represent the same or corresponding parts throughout the several views, there is seen in FIG. 1 a torque splitting differential brake apply mechanism generally designated 10. This mechanism 10 has a rotary input member 12 driven by a gear 14 which in turn is controlled by an operator, not shown. The input member 12 is rotatably supported on a pair of output or driven members 15 and 16 by a pair of bearings 17 and 18. The output members 15 and 16 are rotatably supported in a housing structure 19 by respective bearing members 20 and 21.

The input member 12 has formed therein a plurality of apertures in each of which is disposed a ball or cam driver 24. The apertures 22 have a diameter slightly larger than the diameter of the balls 24. The output member 15 has an inner spline surface 26 through which the member 15 is drivingly connected with a shaft member 28 which in turn is connected with a conventional brake apply mechanism 30.

The driven member 16 has a splined inner surface 32 through which it is drivingly connected to a shaft 34 which in turn is drivingly connected to a conventional brake apply member 36. The brake apply members 30 and 36 will generally be cam members, which upon rotation of the respective shafts 28 and 34, will cause the energization or actuation of conventional brake shoes or friction pads (not shown). These brake shoes or pads are well known devices as is their cooperation with a rotating member to cause braking of a vehicle. These brake devices do not form a part of the invention and it is not considered necessary at this point that a further discussion or description is required.

When the operator rotates the gear member 14, the gear member 12 will also rotate. The cam drivers 24 are driven about a longitudinal support axis 38. The cam drivers 24 will engage the driven members 15 and 16 and cause rotation of these members. The rotation of members 15 and 16 will result in actuation of the brake members 30 and 36.

Figures 2, 3:
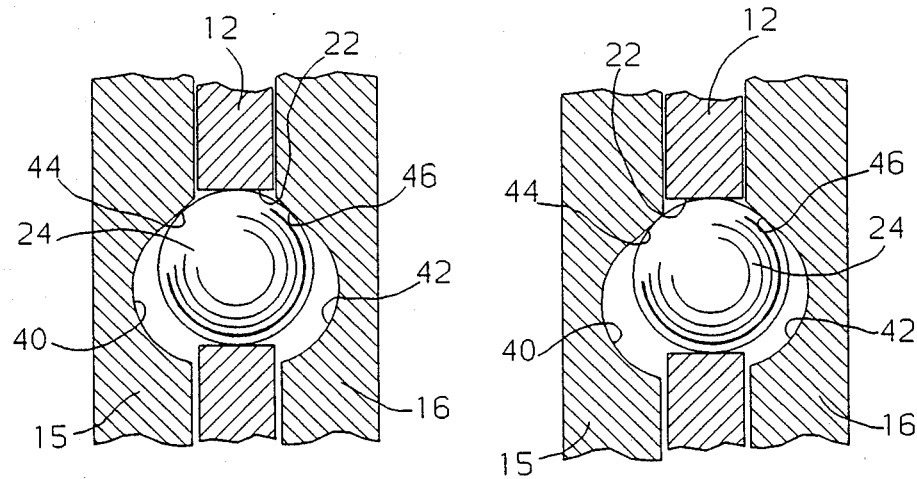
FIG. 2 is a view taken along line 2—2 of FIG. 1.
FIG. 3 is a view similar to FIG. 2 showing the output members after relative rotation has occurred.
Figure 4:
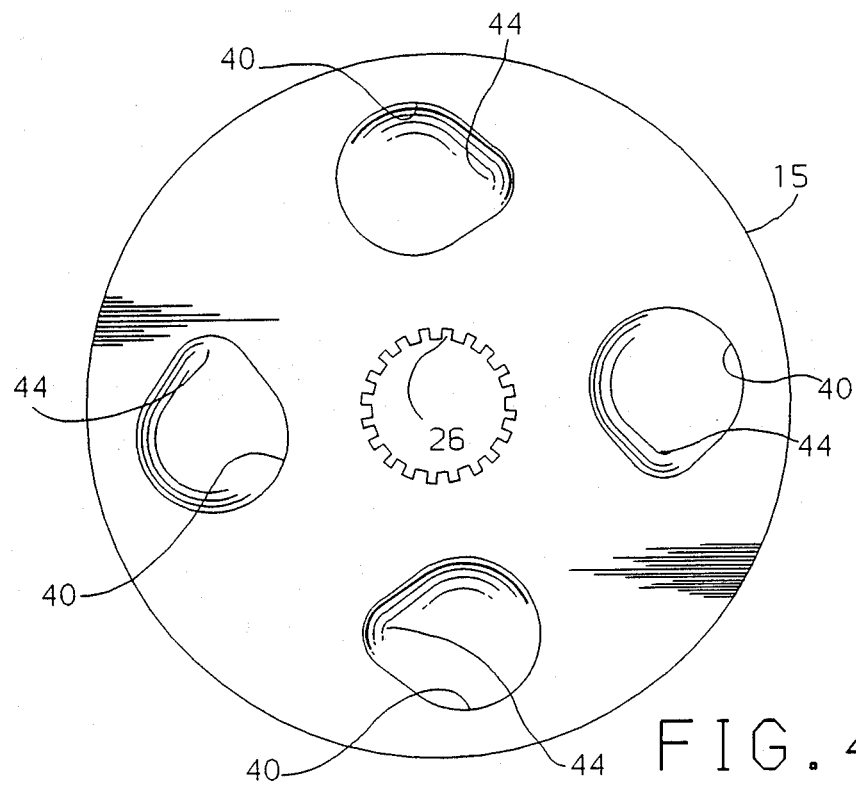
FIG. 4 is an elevational view of one of the output members showing the cam surface machined therein.

In FIG. 4, the driven member 15 is seen to have formed therein four cam surfaces 40. These cam surfaces are identical. The driven member 16 has identical cam surfaces formed therein and, as best seen in FIG. 2, a cam driver 24 is disposed in the space formed by the cam surfaces 40 on member 15 and a similar surface 42 formed on member 16. The cam surfaces 40 and 42 each have respective ramp portions 44 and 46. In the neutral or unbraked position shown in FIG. 1, the contact between cam drivers 24 and the ramps 44 and 46 of the cam surfaces 40 and 42 is minimal. That this point, the cam drivers 24 will be disposed in the deepest part of the respective cam surfaces 40 and 42. The initial movement of input member 12 urges the cam driver 24 into full engagement with the ramps 44 and 46. This action causes the output members 15 and 16 to move simultaneously as discussed above and shown in FIG. 2.

When the input member 12 is rotated, the balls 24 will move into abutment with the ramp portions 44 and 46, thus causing the driven members 15 and 16 to be rotated simultaneously by the input member 12. If the brake members 30 and 36 and their respective friction surfaces are simultaneously applied, sufficient resistance will be met by the operator input so that the system will reach equilibrium with the brakes applied and the driven members 15 and 16 will move through the same rotary angle as seen in FIG. 2.

However, it is more likely that, due to wear or tolerances, one brake friction surface will be fully engaged before the other. For this discussion, it will be assumed that the brake surfaces associated with brake member 30 become fully engaged first. At this point, the driven member 15 will cease to rotate. However, the input member 12 will continue to rotate since sufficient resistance has not yet been put forth to signal a full actuation of the brakes. The continued rotation of the input member 12 will result in each cam driver 24 moving along the ramp 44 on the stopped member 15 and therefor being forced axially relative to axis 38 against the ramp 46.

Since the ramp 46 and output member 16 have not moved sufficiently to fully apply the brake ember 36, this axial movement of cam driver 24 will enforce continued rotation of the driven member 16. This results in relative rotation between the driven members 15 and 16. This relative rotation will continue until the brake surfaces associated with brake actuator 36 have fully applied the brake thereby establishing sufficient resistance to prevent further rotation of the driven member 16. This is the position of the torque splitting differential mechanism shown in FIG. 3. Of course, if driven member 16 was the first to be stopped, driven member 15 would continue rotation due to the axial movement of cam drivers 24 in a direction toward cam surfaces 40 or leftward, as viewed in FIGS. 2 and 3.

This torque splitting differential will accommodate differential brake wear and assembly tolerances between the output brakes of a vehicle. The axial space required is greatly reduced compared to a geared differential and is substantially less than that required by a ball recirculating spline. The amount of differential movement that can be accommodated is determined by the diameter of the cam drivers 24 and the width of the input member 12.

The cam drivers 24 are shown as spherical. They could, of course, be cylindrical or wedge-shaped as long as they are permitted to move axially relative to the input member 12 within the cam surfaces 40 and 42.

When comparing the FIGS. 2 and 3, it can be seen that the cam driver 24 has moved rightward from a central position in the aperture 22 to a position offset to the right in aperture 22. This movement of the cam driver 24 permits the cam driver to move out of the deep portion of cam surface 40 toward the end of ramp 44 and toward the deep portion of cam surface 42 and down the ramp 46. It is this action that creates or permits the differential movement between the driven members 15 and 16.

From the foregoing, it should be appreciated that a compact and simple torque splitting differential device is proved while maintaining efficient brake application.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A brake apply mechanism in a vehicle having two independently operated brake mechanisms including a brake apply member for each brake mechanism; said brake apply mechanism comprising: a rotary input member supported for rotation about an axis; a pair of rotary output members operatively connected to respective ones of the brake apply members; cam means disposed on each of said output members; and cam driver means operatively connected for rotation with said input member for cooperating with both said cam means for enforcing rotation of said output members, said cam driver means being free for relative movement parallel to the support axis to permit differential rotation of said output members during brake application.

2. A brake apply mechanism in a vehicle having two independently operated brake mechanisms including a brake apply member for each brake mechanism; said brake apply mechanism comprising: a rotary input member supported for rotation about an axis and having a plurality of operators radially spaced from the axis and extending therethrough; a pair of rotary output members operatively connected to respective ones of the brake apply members and each having a surface facing the other; a plurality of cam surface means disposed on each of said output members, said cam surface means each comprised of a depression in the respective output member and a portion extending from the depression toward the facing surface of the respective output member; and a plurality of cam driver means including a movable element means disposed in a respective aperture in said input member and pairs of said cam surface means in said output members and being operatively connected for rotation with said input member for cooperating with said pair of cam means for enforcing rotation of said output members, said movable element means being free for relative movement parallel to the support axis and along the extending portions of said cam surface means to enforce differential rotation of said output members during brake application.

* * * * *